Figure 2:
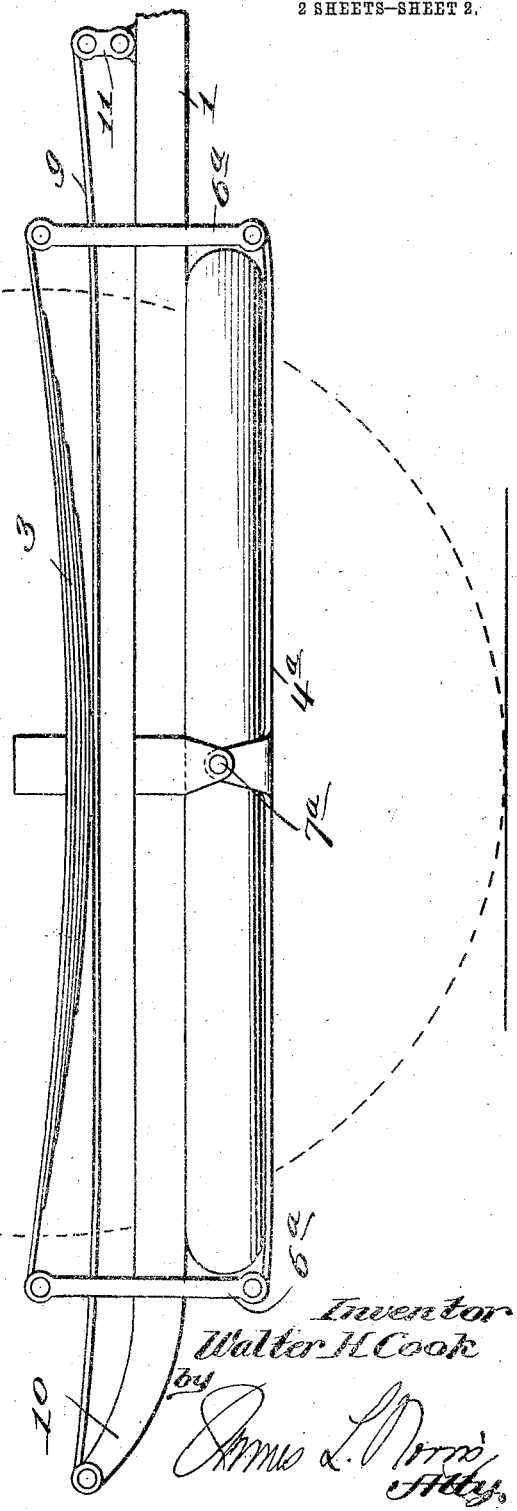

W. H. COOK.
SHOCK ABSORBER FOR AUTOMOBILES.
APPLICATION FILED SEPT. 10, 1912.

1,058,414.

Patented Apr. 8, 1913.

2 SHEETS—SHEET 1.

W. H. COOK.
SHOCK ABSORBER FOR AUTOMOBILES.
APPLICATION FILED SEPT. 10, 1912.

1,058,414.

Patented Apr. 8, 1913.

2 SHEETS—SHEET 2.

Witnesses:

Inventor
Walter H. Cook

UNITED STATES PATENT OFFICE.

WALTER H. COOK, OF NEW ORLEANS, LOUISIANA.

SHOCK-ABSORBER FOR AUTOMOBILES.

1,058,414.      Specification of Letters Patent.      Patented Apr. 8, 1913.

Application filed September 10, 1912. Serial No. 719,663.

*To all whom it may concern:*

Be it known that I, WALTER H. COOK, a citizen of the United States, residing at New Orleans, in the parish of Orleans and State of Louisiana, have invented new and useful Improvements in Shock-Absorbers for Automobiles, of which the following is a specification.

This invention relates to improvements in shock absorbers of the general type illustrated in my co-pending application Serial No. 709098 wherein a balanced shock transmitting element operatively connected to the main spring is employed in coaction with a cushioning means, preferably an air cushion, which takes its bearings against the main frame or a part fitted thereto and against the shock transmitting element.

The present shock absorber is especially designed for automobiles of the "underslung" type wherein the chassis is hung below the axles, and the invention consists in the novel organization of the elements aforesaid and their appurtenances whereby the same advantages which are secured by the construction shown in my co-pending application referred to, may be secured in connection with automobiles having underslug frames and in a construction of simple and compact nature.

Embodiments of the invention are illustrated in the accompanying drawings, wherein:—

Figure 1 is a side elevation showing the improvement in connection with a main frame which has relatively deep end goosenecks. Fig. 2 is a similar view showing a slightly modified construction for use with a main frame which has relatively shallow end goosenecks.

Similar characters of reference designate corresponding parts throughout the several views.

The invention is shown as applied to the forward portion of the main frame, but it is equally as applicable to the rear portion of said frame.

The improved shock absorber is combined with each side bar of the main frame, the latter being arranged below the axles 2, and it involves as its principal elements the main spring 3 and a cushioning means, preferably an air cushion for which the shock transmitting element and the main frame or a part fixed to the latter, furnish opposed bearings.

In Fig. 1, the shock transmitting element is shown at 4, the air cushion at 5, and the links which connect the adjoining ends of the shock transmitting element and the main spring at 6. The spring 3, the element 4, the air cushion 5, and their appurtenances are arranged in a common vertical plane. The element 4 is preferably in the nature of a spring bar of the same length as the spring 3 and, together with said spring is arranged above the corresponding bar 1. The bar 4 is preferably balanced and for this purpose it is joined by a central pivotal connection 7, to a longitudinally arch frame 8 which is secured upon and, in effect, forms a part of the side bar 1. The air cushion 5, comprises an elongated pneumatic tube which fits between, and takes its bearings against, the bar 4 and the part 8. The spring 3 is preferably employed in connection with a longitudinal spring bar 9 of substantially greater length than said spring and, which, in effect, forms a part thereof. The central portions of the spring 3 and the bar 9 are connected to one another and the axle 2, and one end of the bar 9 is pivotally connected to the gooseneck 10 at the end of the bar 1 while the other end of the bar 9 is connected by a link 11 to said bar 1. The link 11 allows the bar 9 to yield under the thrust or pull of the vehicle and consequently by virtue of the provision of the bar 9, the spring 3 is at all times free to effectively receive the first vibratory impulses. The links 6 at each end of the spring 3 form a connecting support for the shock transmitting bar 4 and the latter, owing to its connection with the links 6 and to its central connection, constitutes a balanced bed upon which the air cushion 5 uniformly rests. Owing to the manner of supporting and balancing the bar 4 and to its relation to the air cushion 5, the compression of the air cushion may start at either extremity thereof, so that a wave-like cushioning action is produced which is of the greatest efficiency in uniformly absorbing practically all of the vibrations, even the last ones of slight and reactionary character. It follows that the vehicle is "insulated" from shocks and vibrations and that the mechanisms thereof are efficiently protected against injury. It will be apparent that the provision of the bar 9 refines or modifies the action of the main spring and that the pulsations of said spring are gradually and sensitively transmitted to the cushion 5 by the bar 4, the latter itself taking up some of the vibrations and, with its extremities first, engaging in the compression of the ends of the cushion 5 and thus producing a wave-like compression of said cushion, whereby any remaining vibrations are finally absorbed. The main spring 3, has as will be noted, free action when a shock is first received, and it is only after it has performed its full function that the shock passes to the air tube wherein the lasts of its vibrations are absorbed. It will, moreover, be noted that the construction above described and other constructions within the purview of the invention do not entail any stiffening of the main spring beyond the strength required to properly carry its load, but provide for taking up any shock or vibrations which may prove greater than its capacity to care for and absorb.

The construction shown in Fig. 2 is similar in its principles and in the structural elements employed to the construction shown in Fig. 1, but differs slightly in details of arrangement and is intended for use in connection with vehicle frames in which the bend or gooseneck 10 at the end of the side bar 1 is of slight curvature and extent. In this case, as in the previous embodiment, the side bar 1 furnishes a bearing for the cushion, but the latter instead of being arranged above the side bar and under the frame 8, is arranged under the side bar. The balanced bed for the cushion comprises a bar 4ª which is generally similar to the bar 4, but is pivotally suspended from and under the side bar as by a central connection 7ª and is connected by hanger links 6ª to the end of the spring 3. The spring 3 and the spring bar 9 may be arranged under the axle instead of above it as in the first instance. The construction shown in Fig. 2 operates on the same principles and in the same general manner as the construction shown in Fig. 1.

Having fully described my invention, I claim:—

1. In a shock absorber, the combination with a side bar of a vehicle frame, the latter being hung below the axle, of a longitudinally disposed spring bar supported by the axle and having its ends connected to the main frame, one of the connections comprising a link, a longitudinally disposed shock transmitting bar, a longitudinally disposed main spring supported centrally on the spring bar, connections between the main spring and the shock transmitting bar, and a cushioning agent for which said side bar and said shock transmitting bar furnishes opposed bearings.

2. In a shock absorber, the combination with a side bar, of a vehicle frame, the latter being hung below the axle, of a longitudinally disposed spring bar supported by the axle and having its ends connected to the main frame, one of the connections comprising a link, a second longitudinally disposed spring bar which serves as a shock transmitting element, a longitudinal disposed main spring supported centrally on said first named spring bar, link connections between the ends of the main spring and the ends of the second spring bar, a fixed central pivotal connection for the second spring bar, and an elongated pneumatic cushioning tube for which said side bar and the second spring bar furnish opposed bearings.

In testimony whereof I have hereunto set my hand in presence of two subscribing witnesses.

WALTER H. COOK.

Witnesses:
 THOMAS R. RICHARDSON,
 ROBERT WATERMAN.